United States Patent [19] [11] 4,145,025
Bergeron [45] Mar. 20, 1979

[54] CONTROL DEVICE
[75] Inventor: Ned A. Bergeron, Houma, La.
[73] Assignee: B. W. B. Controls, Inc., Houma, La.
[21] Appl. No.: 750,119
[22] Filed: Dec. 13, 1976
[51] Int. Cl.² ............................................. F16K 3/24
[52] U.S. Cl. .................................... 251/63; 137/456;
137/625.66; 251/63.6
[58] Field of Search ............ 137/456, 458, 461, 625.66;
251/62, 63, 63.4, 63.5, 63.6

[56] References Cited
U.S. PATENT DOCUMENTS
2,667,896  2/1954  Kanuch ............................. 251/63 X
3,791,398  2/1974  Vickery ........................... 137/625.66
3,823,739  7/1974  McMullan ....................... 137/625.66
3,877,484  4/1975  Theriot et al. .................. 137/625.66
3,943,974  3/1976  Connelly et al. ............ 137/625.66 X Primary Examiner—Gerald A. Michalsky
Attorney, Agent, or Firm—Robert W. B. Dickerson

[57] ABSTRACT

A device for controlling the supply of fluid to a valve actuator, thereby controlling the opening and closing of a valve, all in response to an input signal. Means are provided whereby once fluid communication between the valve actuator and the actuator fluid source is closed, said input signal alone may not reopen such fluid communication.

3 Claims, 3 Drawing Figures

4,145,025

CONTROL DEVICE

BACKGROUND OF THE INVENTION

Various control devices have been developed for governing the opening and/or closing of valves in pipe lines. One type of control regulates the supply of fluid, pneumatic or hydraulic, going to a valve actuator. Such regulation is a function of pipe line pressure, perhaps through the medium of intermediate pressure sensing pilots. When pilot pressure is removed, for whatsoever reason, fluid is automatically cut off to the actuator, thereby normally causing valve closure. In most prior art devices, when pilot or line pressure is restored, control devices of the instant type automatically reestablished communication with the valve actuator. For various reasons, generally safety oriented, it has become desirable to require some conscious act to restore such communication. Perhaps the most notable such recent attempts are exemplified by U.S. Pat. Nos. 3,877,484 and 3,963,050. The invention presented herein represents an improvement over such patented inventions.

SUMMARY OF THE INVENTION

An end cap of a housing or body having a pilot fluid entry is affixed to said centrally bored body. Such body has an actuator fluid inlet, outlet leading to the actuator, and exhaust, all communicating with the central bore. A valve member reciprocates within such bore, and may be biased toward the end cap. In a first extreme position of the valve member, communication between the actuator fluid inlet and outlet is blocked. In a second extreme position, such communication is permitted. Means are provided, including the geometry of the valve member, whereby the pressure exerted by pilot fluid alone may not cause such valve member to shift from said first to second position, i.e., from closed to open.

DESCRIPTION OF A PREFERRED EMBODIMENT

Figure 1:
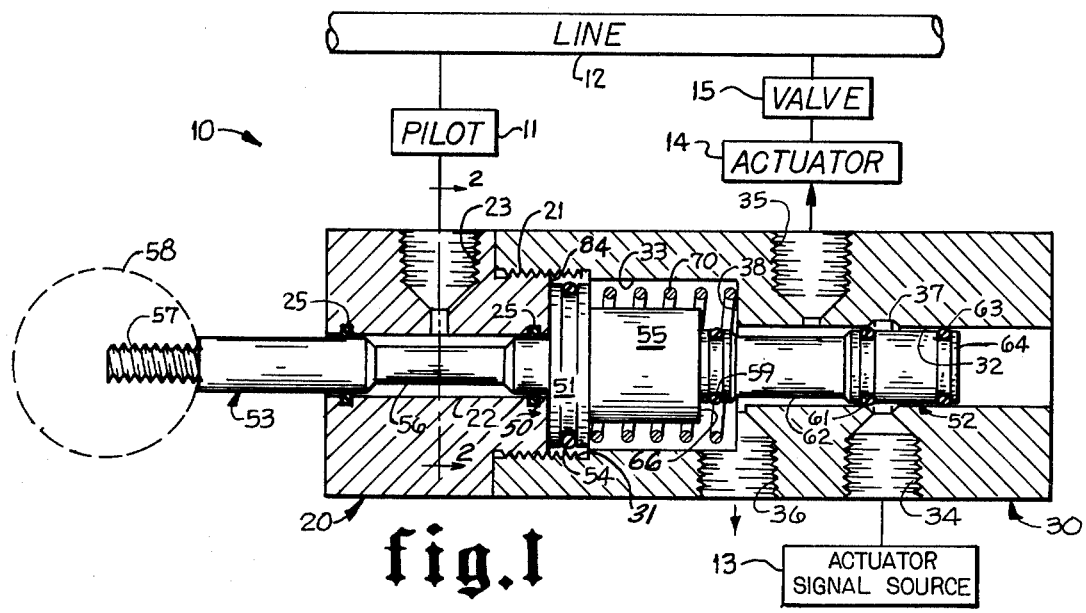
FIG. 1, is a partly schematic, axial section through the assembled control device with the valve member in closed position.
Figure 3:
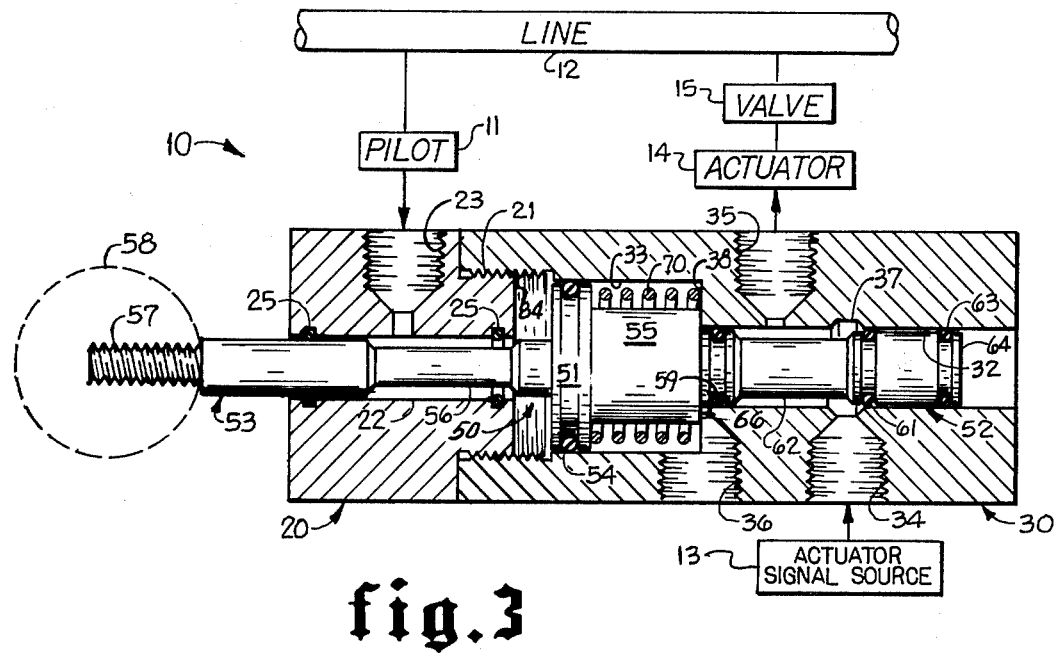
FIG. 3, as a section similar to FIG. 1, but with the valve member in open position.
Figure 2:
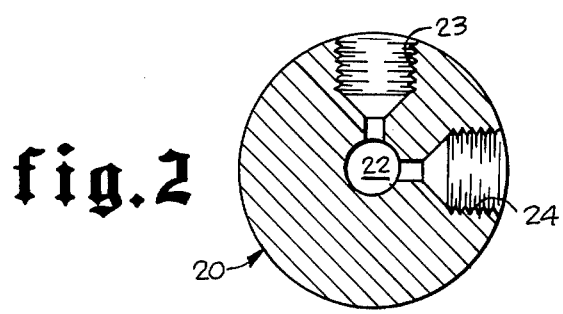
FIG. 2, is a vertical section taken along lines 2—2 of FIG. 1.

As previously mentioned, the control device 10, as illustrated in FIGS. 1, and 3, is respectively shown in closed and open position. Member 10 is comprised basically of three components, namely end cap 20 of body or housing 30, and valve member 50. Cylindrical end cap 20 includes an exteriorly threaded lug 21, and an axial bore 22 extending through the end cap and its lug. O-rings 25 are positioned within annular recesses provided near the ends of bore 22. Radial passageways 23 and 24 communicate between the exterior of the end cap and bore 22. Such passageways may be interiorly threaded, the latter member 24 for receiving a guage fitting (not shown), and the former for communication with an outside signal source, such as pilot 11. Such pilot may provide a fluid signal to inlet passageway 23 as a function of the pressure in line 12, in a known manner.

The exterior threads of end cap lug 21 engage with interior threads 31 provided the wall of enlarged-diameter portion 33 of axial bore 32, which bore extends through housing 30. Radial passageways 34, 35 and 36 establish communication between the exterior of housing 30 and its interior bores. Each such passageway may be interiorly threaded to receive fittings. Annular cutout 37 surrounds the juncture of inlet 34 and axial bore 32. Such inlet 34 communicates with and permits the entry of actuator fluid from an actuator signal source 13. Outlet 35 communicates with a valve actuator 14, it in turn causing opening or closing of valve 15 provided line 12. Exhaust tap 36 permits bleeding of actuator fluid from actuator 14 under certain conditions as described below.

Slidably mounted within the communicating housing and end cap bores is valve member 50. This valve member is basically comprised of a central piston portion 51 with opposite stem portions 52, 53 extending from said piston. Piston 51, having an O-ring provided annular groove 54, reciprocates within enlarged bore portion 33, from the extreme position of FIG. 1, wherein such piston abuts the end 84 of end cap 20 to the extreme position of FIG. 3, where the end 66 of an enlarged portion 55 of stem 52 abuts shoulder 38 which connects bore sections 32 and 33. Moving outwardly from one end of stem 53, adjacent piston 51, such stem has a reduced diameter portion 56, and, at its extreme end, an exteriorly threaded tip 57 adapted to receive knob or handle 58. Looking at stem 52, it has previously described enlarged portion 55, and adjacent thereto is annular recess 59 for receiving an O-ring. Intermediate recess 59 and a similar O-ring receiving recess 61 is reduced diameter portion 62. Outwardly of recess 61 is further O-ring seal receiving recess 63, whereinafter stem 52 terminates at end 64.

Within bore enlargement 33, spring 70 encircles stem enlargement 55, bears against shoulder 38 and piston 51, thereby biasing valve member 50 in the direction of end cap 20.

Consider now the operation of this device. Assume the "open" position of FIG. 3. An input signal would be received through passageway 23, such as from pilot 11, indicating that pressure within line 12 is within acceptable parameters. Such signal or pressure would pass along and through reduced diameter portion 56, through cap bore 22 into housing bore 33 against the face of piston 51, forcing it against the bias of spring 70. Such pressure would tend to move valve member 50 until shoulder 66 of the valve member abuts shoulder 38 of the housing. In this position, actuator fluid from source 13 would enter inlet 34, enter housing bore 32 around reduced diameter valve-stem portion 62, exit outlet 35 to operate on actuator 14 to open valve 15. Note that the seal carried within recess 59 prevents communication between exhaust 36 and either of inlet 34 or outlet 35.

On the pilot pressure being removed, such as by line pressure deviating from established parameters, spring 70 would urge piston 51, and thereby valve member 50, to the FIG. 1, or "closed" position, with piston 51 abutting end 84 of end cap 20. At this stage, pressure from source 13 would be blocked by the seals within recesses 61, 63. Fluid within the actuator may bleed back through outlet 35, around reduced diameter stem portion 62 to leave through exhaust 36. Also note that some fluid within enlarged bore 33 may exhaust through passageway 36, when piston 51 moves from the closed to the open position.

Now consider the particular safety feature of this invention. When the valve member 50 is in the "closed" position of FIG. 1, even when a signal from pilot 11 is received anew, such signal pressure may not alone move the valve member to the "open" position, due to the geometry of reduced diameter stem portion 56 and end cap seals 25. Such movement may only be caused by an axial force exerted against valve member 50, such as by a user grasping knob 58 and pushing it inwardly toward end cap 20. Thus the position of the valve member, or of knob 58, is an indicator of the condition of the entire system, and/or of valve 15.

Although only a single embodiment has been described, it should be obvious that numerous modifications would be possible by one skilled in the art without departing from the spirit of the invention, the scope of which is limited only by the following claims.

I claim:

1. A device for emitting a first fluid signal to a first member as a function of a second fluid signal received from a second member, said device comprising:

a housing having an axial bore therethrough as well as first and second fluid signal inlet means and fluid signal outlet means;

a piston-carrying slide valve member movable within said axial bore from a first position wherein said piston is positioned near one end of said housing to a second position wherein said piston is removed from said one end;

means, operative when said slide valve member is in said second position, permitting said second fluid signal to bias said slide valve member toward said second position; and means preventing said second fluid signal from biasing said slide valve member toward said second position when said slide valve member is in said first position, said preventing means including means for causing force exerted by second fluid signal to be equally and oppositely directed.

2. The device of claim 1, and including additional biasing means urging said said piston toward said first position.

3. The device of claim 1, and including force transmission means provided said slide valve member exterior of said housing.

* * * * *

REEXAMINATION CERTIFICATE (523rd)
United States Patent [19]
Bergeron

[11] B1 4,145,025
[45] Certificate Issued Jun. 24, 1986

[54] CONTROL DEVICE

[75] Inventor: Ned A. Bergeron, Houma, La.

[73] Assignee: B. W. B. Controls, Inc., Houma, La.

Reexamination Request:
No. 90/000,534, Mar. 26, 1984

Reexamination Certificate for:
Patent No.: 4,145,025
Issued: Mar. 20, 1979
Appl. No.: 750,119
Filed: Dec. 13, 1976

[51] Int. Cl.[4] .................................. F16K 3/24
[52] U.S. Cl. ........................... 251/63; 137/456; 137/625.66; 251/63.6
[58] Field of Search ........... 137/456, 458, 461, 625.66; 251/63, 63.6

[56] References Cited
U.S. PATENT DOCUMENTS

| | | | |
|---|---|---|---|
| 2,667,896 | 2/1954 | Kanuch | 251/63 X |
| 3,791,398 | 2/1974 | Vickery | 137/625.66 |
| 3,823,739 | 7/1974 | McMullan | 137/625.66 X |
| 3,877,484 | 4/1975 | Theriot et al. | 137/625.66 |
| 3,943,974 | 3/1976 | Connelly et al. | 137/625.66 X |
| 4,004,610 | 1/1977 | Theriot | 137/614.17 |

OTHER PUBLICATIONS

Proflo Inc. Catalogue (1972) Type B. P. Pilot (Dwg. No. A-1034) and Price List dated Sep. 1, 1972.
Pages D-5 and D-14 of Axelson, Inc. Brochure AD 64-129 dated Feb. 1974.
Page F-412 of "CD-M" Relay of Axelson, Inc.

Primary Examiner—Gerald A. Michalsky
Attorney, Agent, or Firm—Bode & Smith

[57] ABSTRACT

A device for controlling the supply of fluid to a valve actuator, thereby controlling the opening and closing of a valve, all in response to an input signal. Means are provided whereby once fluid communication between the valve actuator and the actuator fluid source is closed, said input signal alone may not reopen such fluid communication.

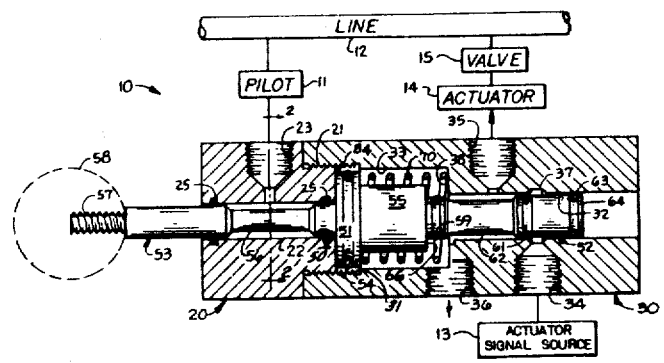

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 2 are determined to be patentable as amended.

Claim 3, dependent on an amended claim, is determined to be patentable.

New claims 4-14 are added and determined to be patentable.

1. A device for emitting a first fluid signal to a first member as a function of a second fluid signal received from a second member, said device comprising:
   a housing having an axial bore therethrough as well as first and second fluid signal inlet means and fluid signal outlet means;
   a piston-carrying slide valve member movable within said axial bore from a first position wherein said piston is positioned near one end of said housing to a second position wherein said piston is removed from said one end;
   means, operative when said slide valve member is in said second position, permitting said second fluid signal to bias said slide valve member toward said second position; and
   means preventing said second fluid signal from biasing said slide valve member toward said second position when said slide valve member is in said first position, said preventing means including means for causing force exerted by *said* second fluid signal to be equally and oppositely directed.

2. The device of claim 1, and including additional biasing means urging said [said] piston toward said first position.

4. *The device of claim 2 further comprising:*
   *a. an exhaust port;*
   *b. means for positioning said valve member in said second position whereby communication is permitted between said first fluid signal inlet means and said fluid signal outlet means, but communication is precluded between said exhaust port and said fluid signal outlet means; and*
   *c. means for positioning said valve member in said first position whereby communication is permitted between said exhaust port and said fluid signal outlet means but is precluded between said fluid signal inlet means and said fluid signal outlet means.*

5. *The device of claim 4 wherein said slide valve member includes an outer end portion located outwardly of said device and adapted to be manually pushed to push and slide valve inwardly from said first position to said second position for manual setting of said slide valve.*

6. *The device of claim 4 wherein said piston carried on said slide valve is provided in a piston chamber in an enlarged portion of said housing, said piston having an outwardly facing pressure face exposed to the fluid pressure of sais second fluid signal inlet means in the second position of said slide valve to hold said slide valve in said second position when the fluid pressure of said second fluid signal inlet means is sufficient to overcome the force of said additional biasing means.*

7. *The device of claim 6 wherein said exhaust port is formed in said housing at a location intermediate said first fluid signal inlet means and said piston chamber thereby preventing application of fluid pressure from said first fluid inlet port to the piston chamber.*

8. *The device of claim 7 further comprising means for sealing said exhaust port from said first fluid signal inlet port and piston chamber when said slide valve member is in said second position.*

9. *A device for emitting a first fluid signal to a first member as a function of a second fluid signal received from a second member, said device comprising:*
   *a housing having an axial bore therethrough as well as first fluid inlet means connected to a first fluid source and a second fluid signal inlet means connected to a second fluid source and fluid signal outlet means;*
   *a piston-carrying slide valve member movable within said axial bore from a first position wherein said piston is positioned near one end of said housing to a second position wherein said piston is removed from said one end;*
   *means, operative when said slide valve member is in said second position, permitting said second fluid signal to bias said slide valve member toward said second position;*
   *an exhaust port;*
   *means for positioning said valve member in said first position whereby communication is permitted between said exhaust port and said outlet port, but is precluded between said first fluid signal inlet means and said fluid signal outlet means;*
   *means for positioning said valve member in said second position whereby communication is permitted between said first fluid signal inlet means and said fluid signal outlet means, but is precluded between said exhaust port and said fluid signal outlet port; and*
   *means preventing said second fluid signal from biasing said slide valve member toward said second position when said slide valve member is in said first posiion, said preventing means including means for causing force exerted by said second fluid signal to be equally and oppositely directed.*

10. *The device of claim 9, and including additional biasing means urging said piston toward said first position.*

11. *The device of claim 9, and including force transmission means provided said slide valve member exterior of said housing.*

12. *The device of claim 10 wherein said piston carried on said slide valve member is provided in a piston chamber in an enlarged portion of said housing, said piston having pressure face exposed to the fluid pressure of said second fluid signal inlet means in the second position of said slide valve to hold said slide valve in scid second position when the fluid pressure of said second fluid signal inlet means is sufficient to overcome the force of said additional biasing means.*

13. *The device of claim 12 wherein said exhaust port is formed in said housing at a location intermediate said first fluid signal inlet means and said piston chamber thereby preventing application of fluid pressure from said first fluid inlet port to the piston chamber.*

14. *The device of claim 13 further comprising means for sealing said exhaust port from said first fluid signal inlet port and piston chamber when said slide valve member is in said second position.*

* * * * *